United States Patent
Bednarzik

(10) Patent No.: US 7,717,137 B2
(45) Date of Patent: May 18, 2010

(54) INTERNAL PIPE REPAIR METHOD AND DEVICE

(76) Inventor: Uwe Harold Bednarzik, 150 Citrus Tree La., Longwood, FL (US) 32750-3443

( * ) Notice: Subject to any disclaimer, the term of this patent is extended or adjusted under 35 U.S.C. 154(b) by 0 days.

(21) Appl. No.: 11/140,179

(22) Filed: May 31, 2005

(65) Prior Publication Data

US 2005/0279417 A1 Dec. 22, 2005

Related U.S. Application Data

(60) Provisional application No. 60/574,975, filed on May 28, 2004.

(51) Int. Cl.
*F16L 55/12* (2006.01)

(52) U.S. Cl. ............... 138/93; 138/97
(58) Field of Classification Search ............ 138/98, 138/97, 90–94, 89
See application file for complete search history.

(56) References Cited

U.S. PATENT DOCUMENTS

| | | | | |
|---|---|---|---|---|
| 1,506,418 A * | 8/1924 | Evensta et al. | ............... | 138/90 |
| 3,103,235 A * | 9/1963 | Stringham, III | ............... | 138/97 |
| 3,269,421 A * | 8/1966 | Telford et al. | ............... | 138/97 |
| 3,750,711 A * | 8/1973 | Conklin et al. | ............... | 138/97 |
| 3,834,421 A * | 9/1974 | Daley | ............... | 138/97 |
| 3,834,422 A * | 9/1974 | Larson | ............... | 138/97 |
| 3,958,607 A * | 5/1976 | Gray | ............... | 138/97 |
| 4,067,349 A * | 1/1978 | Austin et al. | ............... | 38/97 |
| 4,244,895 A | 1/1981 | Nakashin | ............... | 264/36.17 |
| 4,429,720 A * | 2/1984 | Beck et al. | ............... | 138/97 |
| 4,565,222 A * | 1/1986 | Lundman | ............... | 138/93 |
| 4,660,603 A * | 4/1987 | Tash | ............... | 138/92 |
| 4,660,644 A * | 4/1987 | Egnor | ............... | 166/285 |
| 4,883,094 A * | 11/1989 | Vetter | ............... | 138/89 |
| 5,194,193 A | 3/1993 | Humphreys et al. | ............... | 264/35 |
| 5,234,034 A * | 8/1993 | Lyon | ............... | 138/93 |
| 5,353,842 A * | 10/1994 | Lundman | ............... | 138/93 |
| 5,427,153 A * | 6/1995 | Tash | ............... | 138/93 |
| 5,867,547 A * | 2/1999 | Lee | ............... | 376/204 |
| 6,416,692 B1 | 7/2002 | Iwasaki-Higbee | ............... | 264/36.17 |
| 6,435,566 B1 | 8/2002 | Topf, Jr. | ............... | 285/236 |
| 6,539,978 B1 | 4/2003 | McGuire | ............... | 138/98 |
| 6,619,886 B1 | 9/2003 | Harrington | ............... | 405/184.2 |
| 6,837,273 B2 | 1/2005 | Woolstencroft | ............... | 138/98 |
| 6,899,138 B2 * | 5/2005 | Lundman | ............... | 138/93 |
| 6,901,966 B2 * | 6/2005 | Onuki et al. | ............... | 138/93 |

* cited by examiner

*Primary Examiner*—Patrick F Brinson

(57) ABSTRACT

A device and method for internally repairing pipes. The device consists of a reusable, elastomeric shell configurable for two, three, and four-pipe junctions. The design of the device aids in positioning the expandable shell over and helps seal off the leak area inside a pipe. Once inflated into proper position, a sealant is injected into the leak area. Not only does the sealant eventually seal and fortify inside the pipe it also forms a seal around the outside of the pipe. Once the sealant has cured, the device is deflated and removed from the pipe. Minimal pipe preparations are necessary before implementing a repair. The device can also be temperature modulated to enhance sealant cure.

19 Claims, 3 Drawing Sheets

INTERNAL PIPE REPAIR METHOD AND DEVICE

CROSS REFERENCE TO RELATED APPLICATIONS

Figure 1:
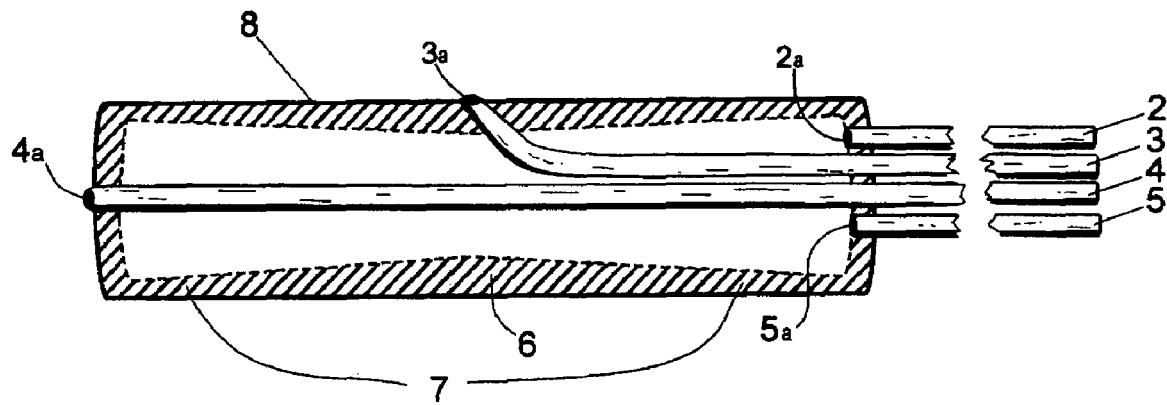

This application claims benefit of U.S. Provisional Patent Application Ser. No. 60/574,975 which was filed on May 28, 2004 and is incorporated herein by reference in its entirety.

FIELD OF INVENTION

This invention pertains to the area of in-situ repair of inaccessible plumbing systems whether they are underground, in-between walls or otherwise unreachable for normal repair methods. The advantages of internally repairing leaking pipe systems include eliminating demolition and repair costs associated with exposing a difficult to get to pipe leak and more rapidly returning the system to operating condition. Internal pipe repair also diminishes the opportunity for secondary leakage caused by the disruptive nature of exposing pipe.

BACKGROUND OF INVENTION

Up to the present, internal pipe repair methods have approached repairing leaks in generally three different ways. One strategy involves installing resin coated or thermo-set liners along the entire section of suspected leaking pipe. The liner is usually held in position by inversion tubes, or direct gas or fluid pressure. A second strategy relates to positioning fibrous, resin impregnated or ribbed liners over a more specific section of pipe. This method may use inflatable bladders or other methods to hold the liner in place until set and cure. A third strategy of internal pipe repair involves directly applying sealant via elastic inversion tubes, plugs, pigs, or flooding the entire pipe directly.

Referring to the first strategy as embodied by Woolstencroft, U.S. Pat. No. 6,837,273, a fibrous, resin laden liner is utilized to seal entire sections of leaking pipe or conduit. McGuire, U.S. Pat. No. 6,539,978, uses a thermo-set technique instead of resin cure to effect seal of a leaking pipe. In either case, entire sections of pipe need to be lined to seal the smaller leaking portion, and therefore, knowledge as to the exact leak position is not necessary. Though both methods deal with leaks in linear sections of pipe, they do not deal with multiple opening junctions or severe pipe offset. Also, proper pipe preparation is often critical for these applications.

A second strategy for internal pipe repair can be seen in Topf, Jr., U.S. Pat. No. 6,435,566 and Harrington, U.S. Pat. No. 6,619,886. Topf, Jr. utilizes an internal interlocking rib and band system that holds a flexible sleeve in place. Harrington uses a resin impregnated sleeve that is pressed in place by a heated inverted tube. Although these methods aren't hampered by the requirement to line an entire section of pipe to repair just a small leak section, they still do not address multiple opening junctions and require proper pipe preparation. Also, knowledge of exact leak location is necessary to properly position the sleeve.

Finally, a third strategy deals with flooding entire pipe sections with sealant i.e. Nakashin U.S. Pat. No. 4,244,895 or Humphreys, et al., U.S. Pat. No. 5,194,193. Whereas, Humphreys, et al.'s method uses wax as a reusable sealant, Nakashin's technique expends self-curing grout in which the excess must be discarded and the sealant inconsistently held in place by a non-reactive fluid. Even the effectiveness of Humpheys, et al's reusable wax method is limited by operating temperature, pressure, and fluid reactivity requirements of the sealed pipe. A more refined method by Iwasaki-Higbee, U.S. Pat. No. 6,416,692 utilizes inversion tubes to force sealant into pipe cracks and voids. Knowledge as to the exact leak position is not necessary with this inclusive strategy of flooding or sealing entire sections of suspect pipe. As with the earlier sealing methods, however, multiple opening junctions are not addressed and proper pipe preparation is critical.

SUMMARY OF INVENTION

The invention comprises a device and method for effectively sealing a large variety of pipe leaks in a wide range of leak situations. It overcomes shortcomings in the previous art relating to proper pipe preparation, relative location of the pipe leak, multiple opening and sharp angled junctions, and exact positioning over a leak area. Designed for flexibility, this invention brings internal pipe repair to a higher level of utility and effectiveness.

Due to the isolating nature and other related features of the invention, pipe contents can remain in place during the repair when the device is inflated over a leak area. Whether sewage, potable water, or other materials or gases, a repair can be effected without evacuating the pipe's contents. In those instances where pipe flow cannot be entirely halted, the invention can be configured to allow flow-through pressure relief during repair. These features eliminate the need for time-consuming pipe preparation and help expedite the repair process.

With the proper use of the invention including the use of thicker sealants, repairs can be affected on leak areas not surrounded by solids or liquids. Examples of these types of leaks would include pipe leaks in open atmosphere such as those between walls or those surrounded by other pipes. Properly selected sealants chosen for their intended environment would include, but are not exclusive to, moisture insensitive, catalyst cured epoxies and acrylics, moisture activated and catalyst driven polyurethanes, and polyureas.

As revealed in the following figures and drawings, the shell's considerably hollow interior is absent of a flexibility decreasing second wall. Different embodiments of the invention can accommodate critical pipe angles and multiple opening junctions. Critical pipe angles would include, but are not exclusive to, 90-degree elbows, 180-degree loops, and consecutive arraignments of like couplings. Elongated versions of the invention would better address longitudinal and large offset pipe leaks. Multiple opening junctions would include, but are not exclusive to, tees, wyes, traps, crosses, and double wyes.

Finally, the invention inherently allows for properly positioning itself over the leak area and also enhancing the cure time of the selected sealant. Due to its unique elements, no other supplemental apparatus is needed to find and then position the invention over a pipe leak. Similar elements are incorporated to help circulate temperature modulated gas or liquid through the invention to enhance sealant cure.

DETAILED DESCRIPTION

The invention involves positioning a uniquely designed, inflatable device illustrated in FIGS. 1 to 4 over the leak area inside a leaking section of pipe and introducing a flowable sealant via the device's middle port 3a to effectively seal both inside and outside the pipe. The invention can be designed to perform in a wide range of pipe diameters and to fit in all manner of pipe junctions. Design features of the device aid in exact positioning over a leak area as well as introducing modulated temperature to the repair area to control sealant cure.

Figure 2:
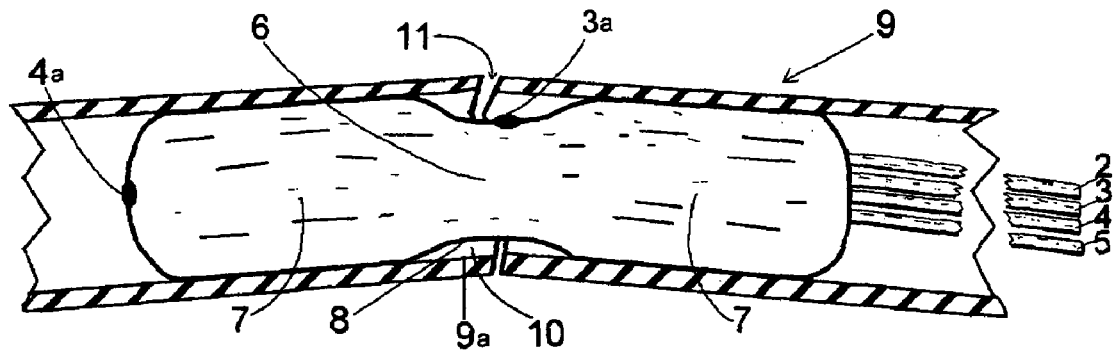

As illustrated in FIG. 1, The inflatable device consists of an elastomeric shell comprised of a material such as silicone rubber which is also desirable for its known release properties. The middle 6 of the device has a thicker shell wall to restrict expansion in this area upon inflation and whose outer surface is configured smooth enough to further aid in release from cured sealant deposited inside a section of pipe. A correspondingly thinner shell wall toward the device's end sections 7 ensures an earlier, broader expansion at these areas upon inflation. As illustrated in FIG. 2, when positioned over a leak area 11 inside a pipe 9 the device will initially expand at its ends 7 during inflation and form a seal where the shell outer surface 8 at the inflated ends 7 contacts the pipe inner wall 9a. The leak 11 will thus be isolated between these expanded ends 7. The less inflated middle section 6 of the device will allow for some clearance 10 between the shell outer surface 8 and the pipe inner wall 9a. This clearance can be adjusted by inflating or deflating middle section 6 via inlet port 2a and outlet port 5a. A flowable sealant is then introduced via external port opening 3a situated in the middle less expanded section 6 of the device. The adjustable clearance 10 between the device's outer wall 8 and the pipe inner wall 9a will be filled by the sealant. The sealant will not only eventually seal and fortify the clearance 10 inside the leaking pipe, it will also flow out of the leak area 11 and encase and fortify the pipe 9 from the outside. The sealant will even form an exceptionally strong composite with surrounding aggregate when present. Sealants can be water insensitive such as, though not exclusive to, acrylics & epoxies, which have superior bonding, curing, strength, and chemical resistance properties. More flexible sealants such as, though not exclusive to, moisture activated polyurethane resins may be employed where constant pipe movement is expected.

Figure 3:
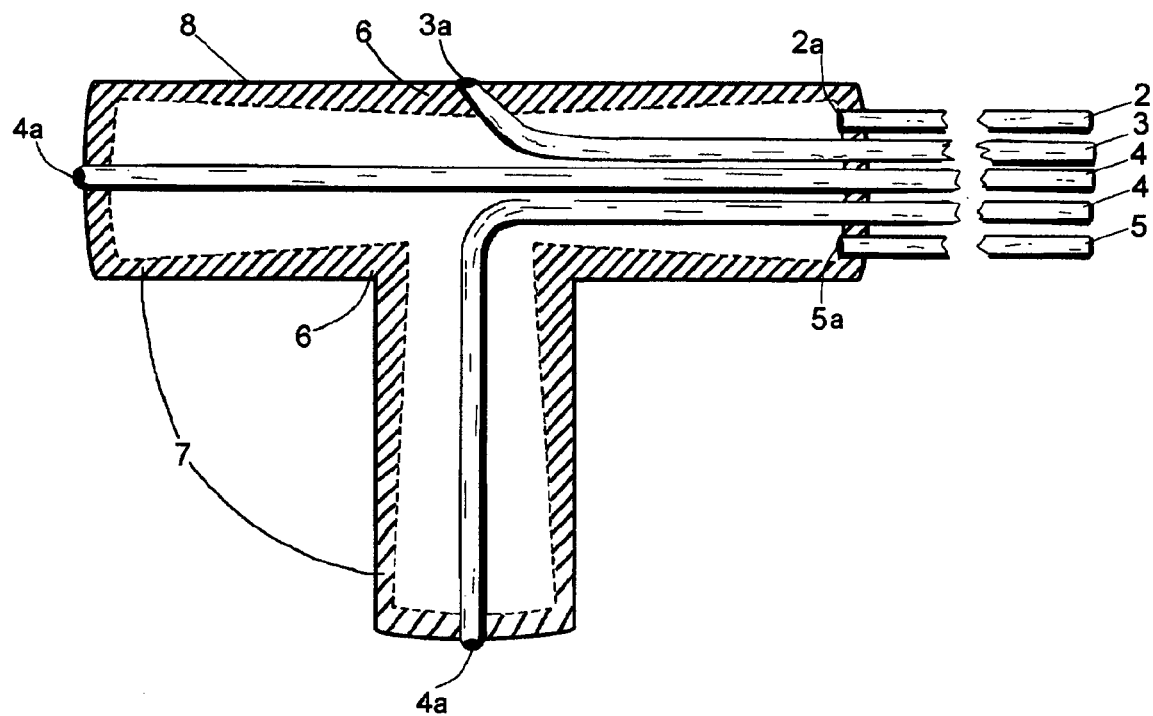
Figure 4:
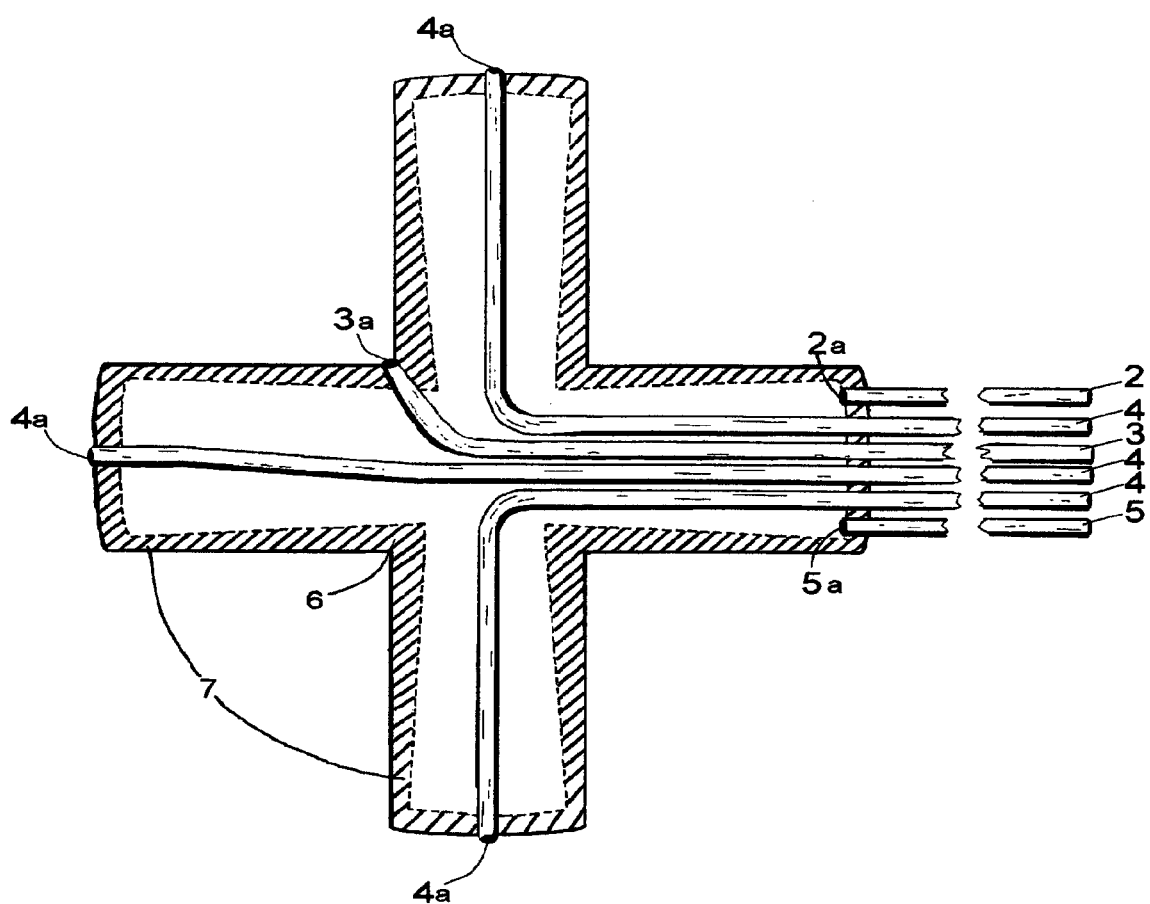

The device's shape and elastomeric characteristics can be custom designed to fit a vast range of pipe sizes and configurations. Pipe diameters smaller than six millimeters to larger than three meters can be accommodated by this invention. Even leak repair of junctions of disparate pipe diameters is possible with this highly flexible design. The linear inflatable device depicted in FIGS. 1 and 2 can be used to isolate and repair leaks in both straight and angled, pipe and pipe couplings. The device's substantially flexible design further allows it to accommodate angles beyond 180-degrees, and consecutive angles such as, but not exclusive to, plumbing loops and multi-directional sections of pipe. As illustrated in FIG. 3, a three-sided inflatable device is designed to isolate and repair leaks in three-way pipe junctions including, but not exclusive to, tees, traps, and wyes. As illustrated in FIG. 4, a four-sided inflatable device is designed to isolate and repair leaks in four-way pipe junctions including, but not exclusive to, crosses and double wyes. Other multiple-way constructions are possible for as yet unforeseen pipe configurations.

As illustrated in FIG. 2, the middle port 3a via tube 3 as well as the end port 4a via tube 4 can be utilized to help position the device over the leak area 11 inside the pipe 9. With the suspected leaking pipe 9 closed off at all but one end, the device can periodically be inflated while progressively being moved through the pipe 9 towards the leak 11. At each temporary inflation point, low-pressure gas or liquid can be introduced through ports 3a and 4a to determine if pressure maintains after the pressure source is selectively turned off. A steady pressure reading would indicate that the section of pipe exposed to that port is not leaking. A falling pressure reading would indicate that the section of pipe exposed to that port contains the leak. When falling pressure is indicated at the middle port 3a and not the end port 4a, the device is positioned over and has isolated the leak 11. Similarly, a more basic shell configured without tube(s) 4 and port(s) 4a will also find a leak when pressure drops at port 3a. Otherwise, falling pressure at both ports 3a and 4a may indicate multiple leaks or an elongated leak area. More than one repair treatment would be called for in this instance.

Again referring to FIG. 2, elastic tube 4 and corresponding port 4a can instead be used as a pressure-relieving pass through element. Elastic tube 4 and port 4a can be open and accessible to conditions inside pipe 11 including fluid and gas flow associated with said pipe. This feature would be advantageous during repair where material flow cannot be completely halted inside pipe 9.

Another function elastic tubes 3 and 4 can serve relates to constraining longitudinal expansion of the device upon inflation. A more lateral and radial expansion of the device lends more range in pipe diameter a specific shell diameter can operate in.

Finally, the device can be warmed or cooled by circulating heated or chilled gas or liquid through inlet port 2a via tube 2 and outlet port 5a via tube 5 when positioned over the leak area 11 inside the pipe 9. The heat or cold would conduct through the device's elastomeric shell and warm or cool the sealant thus controlling its cure time. When sealant is heated for example, the device could consequently be earlier removed and the repaired section of pipe sooner put back into service. Cooling may be employed to moderate the cure time of extremely fast setting sealants.

What is claimed is:

1. A substantially flexible pipe repair device comprising:

An integrally formed shell, which is sufficiently hollow to contribute significant flexibility in angled sections of pipe, comprising expandable end sections branching from an adjustably expandable middle section, wherein the outer surface of the middle section is configured to release from cured sealant and the attached end sections are arranged to be accommodated within each portion of a multiple port pipe junction;

at least one first tube connecting the shell to a pressure regulated inflation source; and, at least one second tube connecting the shell to a sealant reservoir.

2. The device of claim 1 wherein the at least one first tube is connected on one end to a pressure regulated inflation source and on the other end to an inlet port in the shell.

3. The device of claim 2 wherein the at least one first tube comprises two tubes connected in fluid communication with a temperature modulated gas or fluid source whose contents can be circulated through the device.

4. The device of claim 1 wherein the at least one second tube is connected on one end to a pressure regulated sealant reservoir and on the other end to an exit port located in the middle section of the shell for conveying sealant through the second tube.

5. The device of claim 1 further including at least one third tube connecting corresponding exit ports positioned at the end sections of the device and extending therebetween to allow a fluid to pass completely through the device.

6. The device of claim 1 wherein the shell is configured with two, three, or four end sections branching from the middle section for use in an elbow, tee, or cross pipe junction.

7. The device of claim 1, wherein the device has one of a substantially linear, tee, or cross configuration.

8. The device of claim 1, wherein at least one of the end sections branches substantially perpendicular from a body of the shell.

9. The device of claim 1 wherein the middle section is configured with a collapsible surface which is sufficiently smooth to aid release from cured sealant inside a section of pipe.

10. The device of claim 1 wherein the shell is configured with a single wall.

11. A substantially flexible pipe repair device comprising:
an integrally formed, considerably hollow shell comprising expandable end sections branching from an adjustably expandable, and retractable middle section, wherein the shell has one of an essentially linear, tee, or cross configuration;
at least one first tube connecting the shell to a pressure regulated inflation source; and,
at least one second tube connecting the shell to a sealant reservoir.

12. The device of claim 11 wherein the at least one second tube is first used in conjunction with pressure testing equipment to help position the device over a leak area, but, thereafter, is used to convey sealant to the leak area.

13. The device of claim 11 wherein the outer surface of the middle section is sufficiently smooth to facilitate release from cured sealant deposited inside a section of pipe.

14. The device of claim 11 wherein the shell is configured with a single wall.

15. A substantially flexible pipe repair device comprising:
an integrally formed, single walled shell comprising expandable end sections branching from an adjustably expandable and retractable middle section, wherein the shell has one of an essentially linear, tee, or cross configuration for use in an elbow, tee, or cross pipe junction;
at least one first tube connecting the shell to a pressure regulated inflation source; and
at least one second tube connecting the shell to a sealant reservoir.

16. The device of claim 15 wherein the at least one second tube is first used in conjunction with pressure testing equipment to help position the device over a leak area, but, thereafter, is used to convey sealant to the leak area.

17. The device of claim 11 further including at least one third tube connecting corresponding exit ports positioned at the end sections of the device and extending therebetween to allow a fluid to pass completely through the device.

18. The device of claim 4 wherein the at least one second tube is first used in conjunction with pressure testing equipment to help position the device over a leak area, but, thereafter, is used to convey sealant to the leak area.

19. The device of claim 15 further including at least one third tube connecting corresponding exit ports positioned at the end sections of the device and extending therebetween to allow a fluid to pass completely through the device.

* * * * *